(12) United States Patent
Hollis

(10) Patent No.: US 7,121,445 B2
(45) Date of Patent: Oct. 17, 2006

(54) POWER TOOL HOUSING

(75) Inventor: Robert R. Hollis, Chicago, IL (US)

(73) Assignee: Credo Technology Corporation, Broadview, IL (US)

( * ) Notice: Subject to any disclaimer, the term of this patent is extended or adjusted under 35 U.S.C. 154(b) by 8 days.

(21) Appl. No.: 10/420,471

(22) Filed: Apr. 22, 2003

(65) Prior Publication Data

US 2004/0211578 A1    Oct. 28, 2004

(51) Int. Cl.
    *B25C 7/00*    (2006.01)
(52) U.S. Cl. ........................ 227/147; 227/156
(58) Field of Classification Search ............... 173/217, 173/171, 121, 211; 310/219, 238, 239, 242, 310/245, 246; 267/158, 164, 38; 227/134, 227/139, 140, 147, 156
    See application file for complete search history.

(56) References Cited

U.S. PATENT DOCUMENTS

| | | | |
|---|---|---|---|
| 3,433,989 A | 3/1969 | Leavitt | |
| 3,617,786 A * | 11/1971 | Stielper | 310/242 |
| 3,967,148 A * | 6/1976 | Walsh | 310/239 |
| 4,056,749 A | 11/1977 | Carlson et al. | |
| 4,219,749 A * | 8/1980 | Rettberg | 310/89 |
| 4,223,744 A * | 9/1980 | Lovingood | 173/48 |
| 4,329,612 A * | 5/1982 | Averill | 310/247 |
| 4,340,831 A * | 7/1982 | Kuhlmann et al. | 310/239 |
| 4,342,929 A * | 8/1982 | Horne | 310/43 |
| 4,344,009 A * | 8/1982 | Reynolds | 310/242 |
| 4,366,403 A * | 12/1982 | Simpson et al. | 310/239 |
| 4,498,230 A | 2/1985 | Harris et al. | |
| 4,516,047 A | 5/1985 | Duverger | |
| 4,538,085 A | 8/1985 | Tanaka | |
| 4,574,471 A | 3/1986 | Dibbern et al. | |
| 4,613,781 A | 9/1986 | Sanders | |
| 4,684,774 A | 8/1987 | Dibbern et al. | |
| 4,694,214 A * | 9/1987 | Stewart, Sr. | 310/239 |
| 4,924,129 A | 5/1990 | Copus | |
| 5,402,027 A | 3/1995 | Strobl | |
| 5,487,213 A * | 1/1996 | Hult et al. | 29/596 |
| 5,495,134 A * | 2/1996 | Rosenblum | 310/239 |
| 5,631,513 A * | 5/1997 | Coles et al. | 310/239 |
| 5,717,272 A | 2/1998 | Gobled | |
| 5,818,142 A * | 10/1998 | Edleblute et al. | 310/239 |
| 5,905,323 A * | 5/1999 | Clemente | 310/239 |
| 6,133,665 A * | 10/2000 | Prell et al. | 310/239 |
| 6,294,857 B1 * | 9/2001 | Nakane | 310/239 |
| 6,528,921 B1 * | 3/2003 | Nakane | 310/239 |
| 6,707,198 B1 * | 3/2004 | Debelius | 310/90 |

OTHER PUBLICATIONS

Photos of Housing Endcap from Black & Decker Woodhawk Circular Saw, believed publicly available circa 2001.

* cited by examiner

*Primary Examiner*—Stephen F. Gerrity
*Assistant Examiner*—Paul Durand
(74) *Attorney, Agent, or Firm*—Greer, Burns & Crain, Ltd.

(57) ABSTRACT

A housing for an electric tool has a plurality of spring arms for exerting a spring force on a brush holder that holds a brush for engaging a commutator. Preferably, the spring arms are integral with a tool housing end cap.

21 Claims, 5 Drawing Sheets

POWER TOOL HOUSING

FIELD OF THE INVENTION

The present invention is related to power tools, as well as to housings for power tools.

BACKGROUND OF THE INVENTION

Electric power tools such as portable electric drills, circular saws, jigsaws, sanders, and the like are widely known in the art. Generally, they include an electric motor for rotatably driving a shaft, with a tool such as a drill bit, a saw blade, or the like attached to the shaft. The electric motor is often an AC or DC motor that includes a rotating armature with a commutator. Two non-rotating conducting brushes electrically contact the commutator. The motor assembly, including the armature, the commutator and the brushes, is enclosed in a housing. The brushes must be urged into engagement with the commutator with a spring to ensure good contact with the, provide some degree of tolerance, and also compensate for wear of the brush.

Because electrical current flows through each of the brushes, they are often movably held in an insulating brush box or holder. The brush holder insulates the brush from the housing. The spring which biases the brush into engagement with the commutator is typically contained in the brush holder, and the brush (or the spring) is electronically connected to have a power source such as an AC supply or a DC battery.

During manufacture of such tools in the prior art, the motor armature and commutator were provided pre-assembled, and installed in the housing at the time of final tool assembly. Each brush and brush holder were likewise provided as a pre-assembled unit and installed in the housing at the time of final tool assembly. To speed and simplify tool assembly, the brush holder may have been installed through an open end of the housing by placing it in a bracket that has been pre-formed in the housing. To retain the brush holder in place in the bracket, a housing end cap had either a brush holder locking assembly extending therefrom, so that when the end cap was attached to the housing, the holder locking assembly locked the brush holder in place, or a screw or screws that secure the brush holder to the housing.

To allow for some tolerance in housings and brush holders, and to provide for long service life of the tool, the brush holder locking assembly included a spring member such as a rubber-like polymer layer or pad for engaging the brush holder. By way of particular example, one known tool assembly included a housing end cap having a hollow brush assembly support tube connected thereto. A resilient polymer bumper pad with a barrel portion was inserted into the hollow tube, and had a brush holder-engaging portion that engaged the brush holder. The bumper pad held the brush holder in place, and also provided a degree of protective cushion to the holder to prevent holder breakage if the tool was dropped on its end cap. This known configuration, however, was time consuming to install in the housing.

The commercial market for such tools is competitive, with a large number of competitors vying for market share. In this competitive environment, there are strong business incentives to keep manufacturing costs low. Accordingly, it is desirable to reduce the number of parts and the number of steps required to manufacture the tools.

These and other needs remain unresolved in the art.

SUMMARY OF THE INVENTION

One exemplary embodiment of the present invention is directed to a tool housing for a tool of the type that has a rotating electric motor with brush holders for holding brushes. An exemplary housing of the invention comprises a housing wall and a plurality of spring arms connected to the wall, the spring arms being configured to springingly engage each of the brush holders.

DETAILED DESCRIPTION

Figure 1:
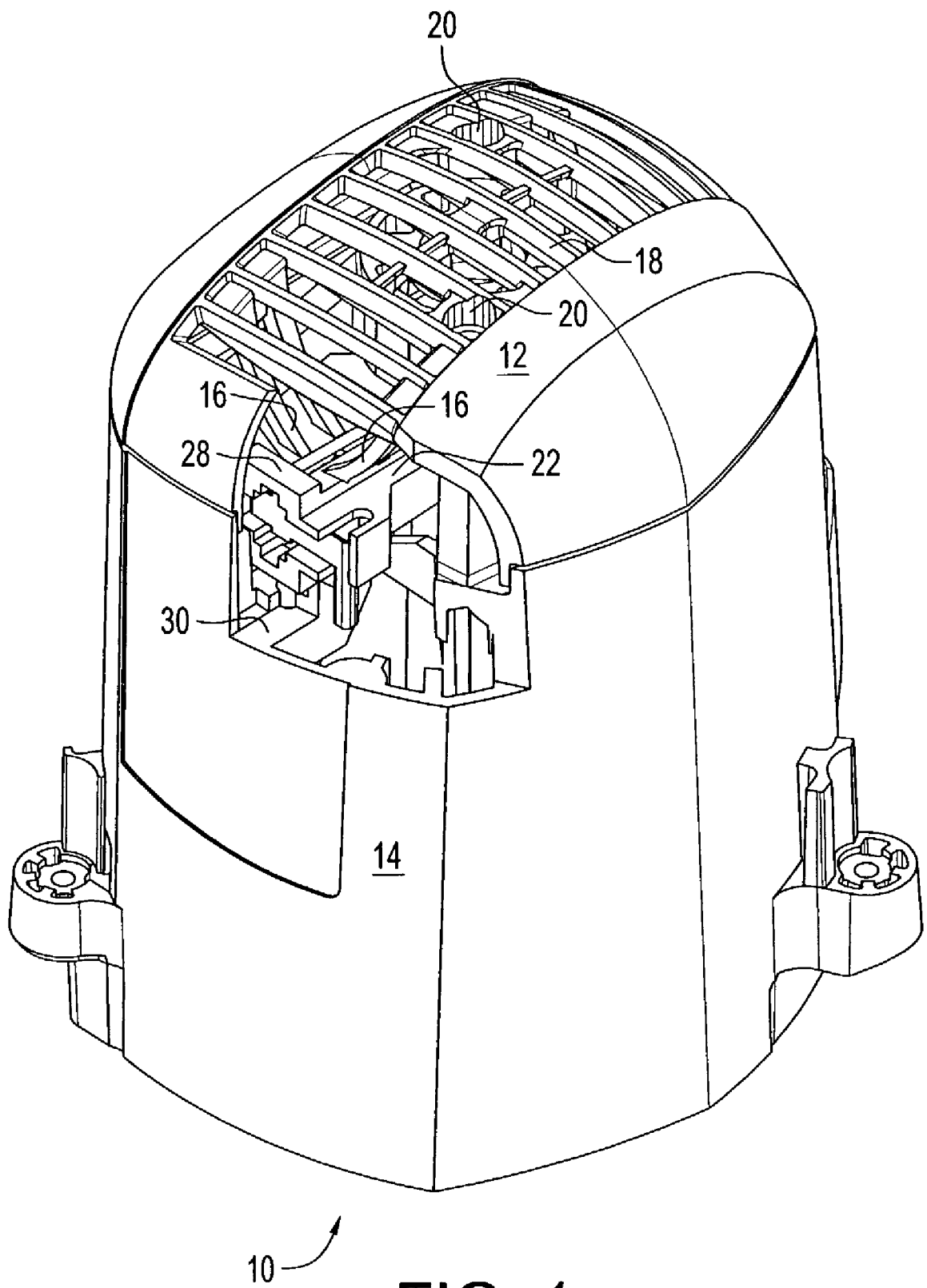
FIG. 1 is a perspective view, partially cutaway, of an exemplary tool housing of the invention.
Figure 2:
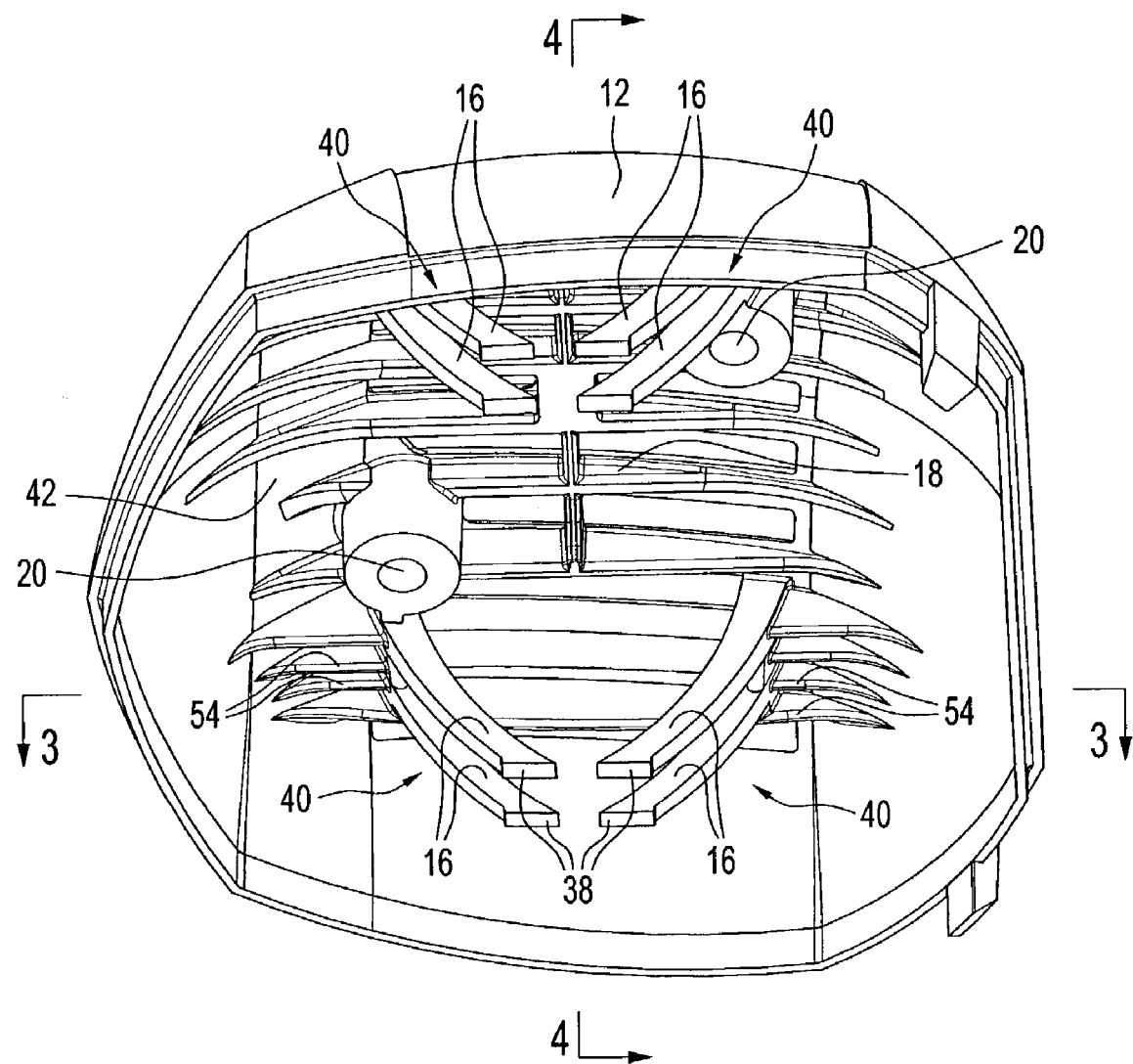
FIG. 2 is a perspective view of the end cap of the housing of FIG. 1.

An exemplary embodiment of the present invention is directed to an electric power tool housing shown generally at 10 in FIG. 1. The housing 10 generally includes a removable end cap 12 and a main body portion 14. As best illustrated by FIG. 2, the end cap 12 has a plurality of integral spring arms 16. The term "integral" as used herein is intended to broadly refer to a general condition of being substantially continuous with. By way of example, as used herein two parts that were formed as a unit with one another would be integral. In the preferred housing end cap 12, the arms 16 and the end cap 12 are preferably formed of injection molded plastic in a single molding process, and are therefore integral with one another. Other formation methods are contemplated, however, as are spring arms 16 that are not integral with an end cap 12.

The end cap 12 further includes a ventilation grate 18 and a plurality of fastener receiving passages 20. The passages 20 may receive a fastener such as a threaded bolt or the like used to attach the end cap 12 to the housing main body 14, with FIG. 1 showing the end cap 12 installed. Although the preferred housing end cap 12 is removable from the housing main body 14, other invention embodiments may include a housing 10 with a permanently attached end cap 12. A removable cap 12 is preferred, however, for reasons such as ease of assembly, servicing of the tool, and the like.

Figure 3:
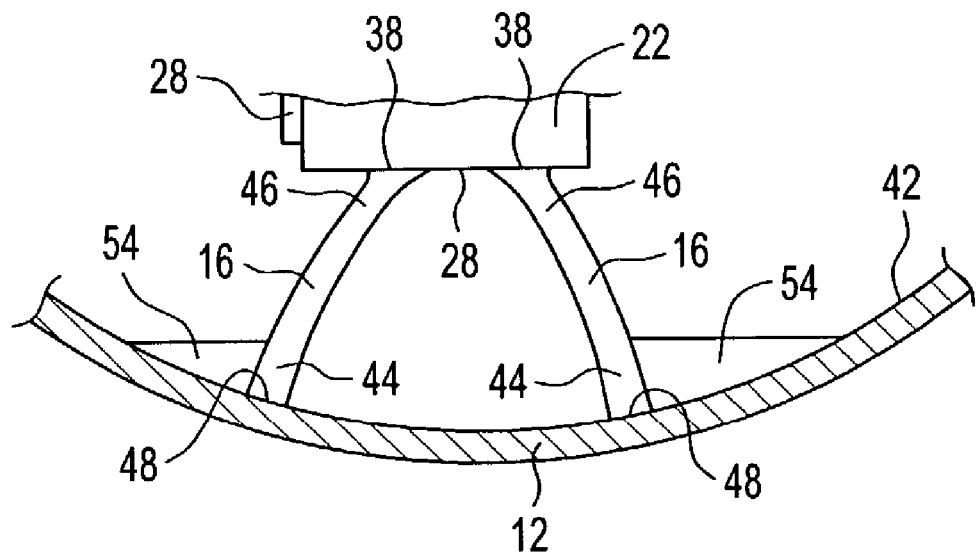
FIG. 3 is a cross sectioned view of the housing end cap of FIG. 2 viewed along the line 3—3 in the direction generally indicated and in engagement with a brush holder.
Figure 4:
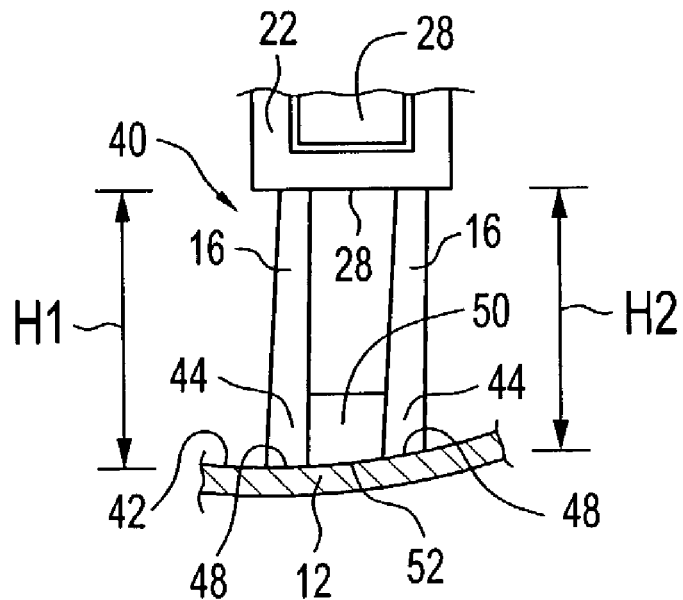
FIG. 4 is a cross sectioned view of the housing end cap of FIG. 2 viewed along the line 4—4 in the direction generally indicated and in engagement with a brush holder.
Figure 5:
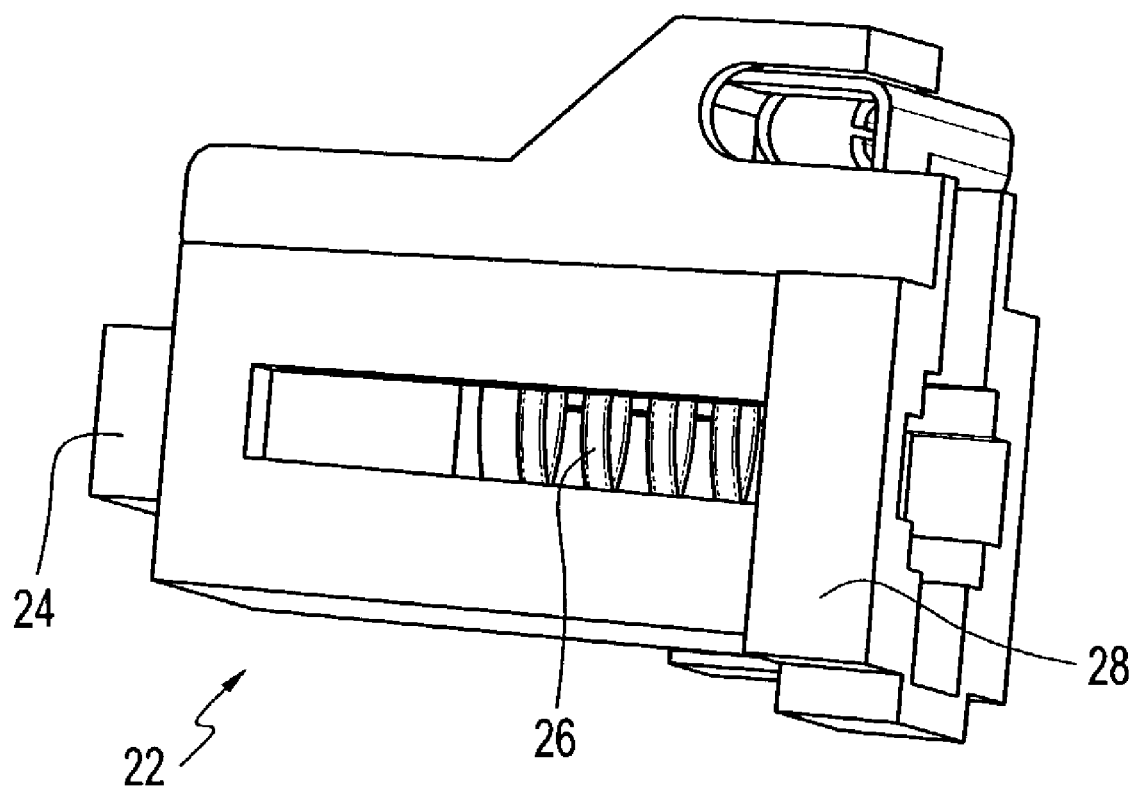
FIG. 5 is a perspective view of an exemplary brush holder.

As best illustrated by FIGS. 1, 3 and 4, the arms 16 are configured to springingly engage a brush holder 22 that supports a brush 24 therein. As used herein, the term "springingly engage" is intended to be broadly interpreted as generally exerting a spring force against something. By way of example and not limitation, if a spring contacts a surface and is at least partially compressed or deflected when in contact with that surface, it is exerting a spring or biasing force and accordingly "springingly engages" the surface. Put another way, the spring arms 16 exert a spring force on the brush holder 22. FIG. 5 illustrates an exemplary brush holder 22. It generally includes at least a carbon brush 24 that is urged in a first direction by a spring 26 held in the brush holder 22, and a top sidewall 28. The brush 24 is for electrically conducting contact with a motor commutator, and typically is, for instance, a piece of carbon that has been molded or cut from a block or sheet.

Figure 6:
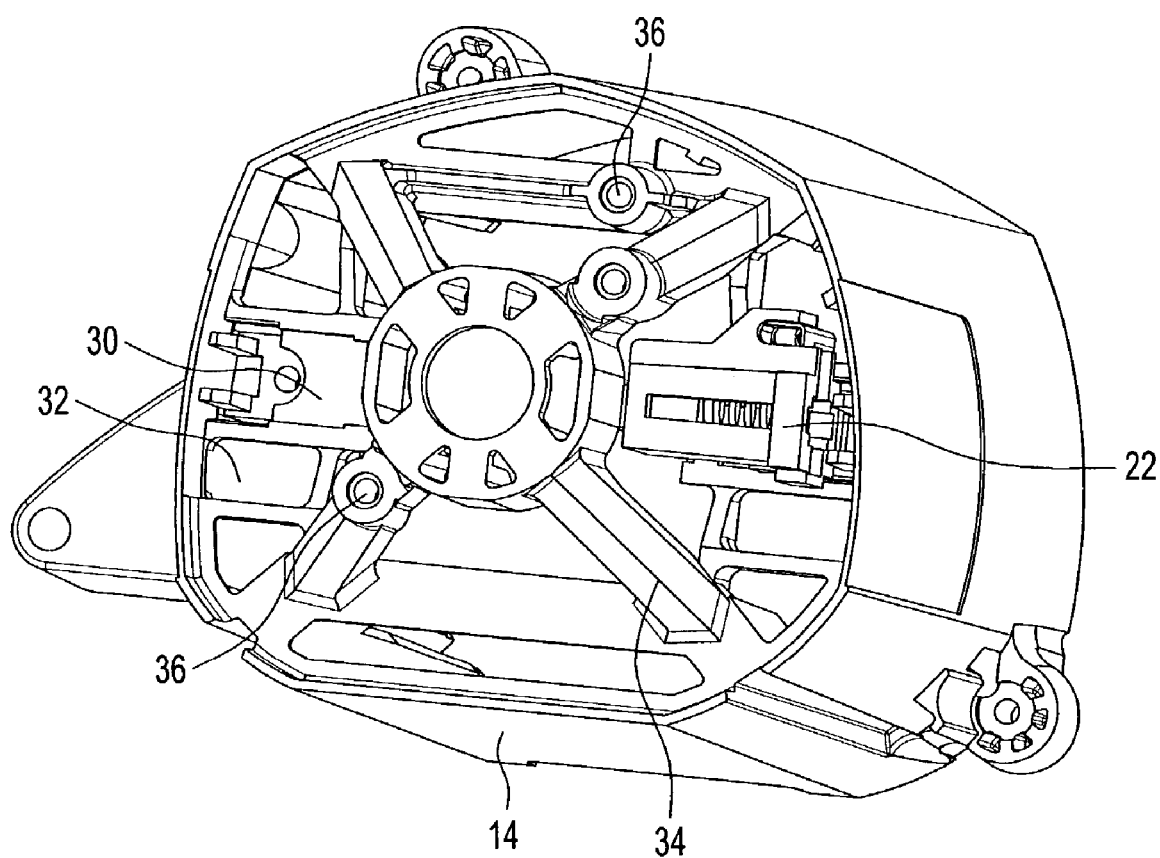
FIG. 6 is a perspective view of an exemplary tool housing of the invention with the end cover removed.

When the end cap 12 is installed on the housing main body portion 14, a plurality of the spring arms 16 springingly engage the brush holder 22 to hold it in place on a bracket 30 connected to an interior wall 32 of the housing main body portion 14. FIG. 6 shows the housing main body portion 14 with the end cap 12 removed. Two brackets 30 for supporting the brush holders 22 are located across the housing main body portion 14 from one another. In the view of FIG. 6, one brush holder 22 is in place on the rightward bracket 30, while no brush holder 48 is in place on the opposing leftward bracket 30. The brush holder 22 is placed on the bracket 30 with the brush facing the interior of the housing main body portion 14.

Although no motor is present in the view of the housing shown in FIG. 6, it will be appreciated that the brackets 30 position the brush holders 22 and accordingly the brushes 24 to engage the rotating commutator of a motor contained in the housing 10. The main body 14 further includes a motor mounting structure 34 that is useful for supporting a motor. The mounting structure 34 includes two threaded passages 36 that cooperate with the fastener receiving passages 20 of the end cap 12 to threadably receive a fastener inserted through the passages 20 to hold the end cap 12 in place.

The brackets 30 are configured to receive and mate with the brush holders 22 to restrain the holders 22 against movement in substantially all directions except in the direction toward the end cap 12. That is, the brackets 30 are generally configured to contact all of the sides of the brush holders 22 except the top sidewall 28. In this manner the brackets 30 support the brush holders 22 and provide restraint against lateral movement generally along the plane of a housing main body portion 14 cross section. It will be appreciated that as used herein the term "restrain against movement" is to be broadly interpreted and is not intended to confer an absolute restraint against any movement. For example, the brackets 30 may be configured to allow for some slight movement in any direction to provide a degree of tolerance.

As best shown by FIGS. 1, 3 and 4, the spring arms 16 engage the brush holder top sidewall 28 to thereby resist movement in the direction towards the end cap 12. In particular, when the end cap 12 is installed on the housing main body 14, the substantially flat top ends 38 of the spring arms 16 engage the top sidewall 28 of the brush holder 22 to hold it in place on the bracket 30. As best shown in FIGS. 2 and 3, the spring arm top ends 38 are of a larger area than a cross section of the arms 16 so as to provide an enlarged surface area for engaging the brush holder 22. As best shown by FIG. 2, the exemplary end cap 12 includes two opposing pairs 40 of spring arms 16 configured to engage one brush holder 22. That is, four individual spring arms 16 engage one brush holder 22. Other invention embodiments are contemplated that could use a different number of spring arms to engage a brush holder 22. Four arms are preferred, however, in that this number has been discovered to provide generally secure engagement.

The spring arms 16 extend from a generally concave interior wall 42 of the end cap 12. Each of the arms 16 has a generally arcuate shape, and is generally tapered from a thicker lower portion 44 to a thinner upper portion 46. Each of the arms 16 has a first end 48 that is proximate to the shell interior wall 42 and distal from the substantially flat top end 38. A base 50 connects lower portions 18 of each individual arm 16 in each of the generally adjacent pairs 40 of arms to one another. A bottom edge 52 of the base 50 is connected to the concave shell interior wall 32. The base 50 is also supported by a plurality of ribs 54 that extend from the back of the base 50 to the shell interior wall 32. The preferred base 50 and the ribs 54 are integral with the arms 16 and the end cap 12.

The spring arms 16 are configured such that they will be bent slightly as the end cap 12 is attached to the main body 14 and they come into contact with the brush holders 22. This bending contributes to the spring force that is developed in the arms 16 and exerted onto the brush holder 22. The arms 16 are arcuately shaped, with the arcuate shape useful to generally evenly distribute the stress that occurs as they are bent over the length of the arms 16. This significantly reduces local concentrations of stress that might otherwise occur in arms of different shapes (e.g., straight arms), and thus reduces the occurrence of cracking in the arms 16.

Also, the generally tapered shape of the arms 16 from the thicker base portion 44 to the thinner upper portion 46 provides a degree of flex to the arms 16 useful for developing a spring force and for avoiding cracking. These features also allow the spring arms 16 to absorb some energy that results when the end cap 12 is impacted, and thereby to cushion the brush holders 22 against breakage that might otherwise result from such impacts. By way of example, portable hand tools are known to frequently be dropped, and often land on their housing end caps 10. Stiff or rigid connection between the end cap 12 and the brush holder 22 when such an impact occurred could lead to damage of the brush holder 22.

Because the preferred end cap interior wall 32 has a general concave shape, each of the two arms 16 in each of the pairs 40 are preferably of differing lengths. This allows the top end 38 of each of the arms in a pair 40 to be at substantially the same level. This is best illustrated through consideration of FIG. 4, where H1 represents the "height" or the extension length of the left arm 16, and H2 represents the "height" or extension length of the right arm 16. As illustrated, H1 is larger than H2 since the right arm 16 extends from a "higher" point on the concave wall 32. The two extension lengths H1 and H2 differ by an amount such that the top ends 38 of the two arms 16 are at substantially the same level. This provides for relatively even engagement of the brush holder 22.

Each of the pairs 40 of two adjacent arms faces another of the pairs 40 so that each arm 16 generally arcs towards an opposing arm 16. As a result, the bottom portions 44 of opposing arms 16 are spaced apart from one another by a distance greater than the distance that separates their upper portions 46. In the exemplary end cap 12, four pairs 40 of arms have been provided.

Although not illustrated in the drawings, it will be understood by those knowledgeable in the art that housings of the present invention will have utility when used with portable electric hand tools such as circular saws and the like to contain a motors for the tool. With reference to FIG. 1 in particular, it will be appreciated that the housing main body 14 may be attached to, for instance, a handheld circular saw frame that included a handle, a saw guide, a base and the like.

Housings of the present invention thereby provide many advantages and solve several problems of the prior art. For example, housings of the present invention are able to substantially eliminate the need for a separate spring member that may otherwise be required for supporting a brush holder in place. As used herein, the term "separate spring member" is intended to broadly refer to any separate member for providing spring force, with examples including rubber and rubber-like polymer pads and layers. Embodiments of the present invention thereby achieve savings in material costs and reduced assembly costs over the prior art that used separate spring members. Other advantages of the present invention will be clear to those skilled in the art.

It will be appreciated that although discussion and description has been made herein of a particular tool and housing embodiment, such treatment has been made only to illustrate the invention. Other invention embodiments and equivalents to various features of the invention as described will be apparent to those skilled in the art.

Various features of the invention are set forth in the attached claims.

What is claimed is:

1. A power tool housing for a hand held power tool of the type that has an electric motor with a rotating commutator, a plurality of conducting brushes for contacting the rotating commutator, and a plurality of brush holders for holding the brushes, the housing comprising:
    a hand held power tool housing wall having a support surface for receiving each of the brush holders and made of injection molded plastic material; and
    a plurality of spring arms integral with said housing wall, said plurality of spring arms being configured to springingly engage the brush holders and made of said injection molded plastic material.

2. A tool housing as defined by claim 1 wherein said housing comprises a removable end cap for the power tool, wherein the brush holders each have a substantially planar sidewall, and wherein each of said spring arms have a substantially flat top end that is coplanar with the brush holder sidewall configured to matingly engage the sidewall to thereby springinly hold the brush holder in place.

3. A tool housing as defined by claim 1 wherein each of said plurality of spring arms has a first end integrally connected to said housing wall, a distal second end extending inwardly from said first end and configured to engage the brush holders and a generally arcuate length between said first and second ends that defines a total radius of curvature between said first and second ends of substantially less than 360°.

4. A tool housing as defined by claim 3 wherein said spring arms are generally tapered from said first end to said second end.

5. A tool housing as defined by claim 3 wherein a plurality of said spring arms are configured to engage one brush holder.

6. A tool housing as defined by claim 3 wherein said generally arcuate length comprises a generally constantly curving length between said first and second ends, wherein said spring arm has a generally bowed shape.

7. A tool housing as defined by claim 1 wherein said plurality of spring arms include a plurality of pairs of two spring arms, a base connecting said two spring arms in each of said pairs.

8. A tool housing as defined by claim 7 wherein each of said plurality of spring arm pairs oppose another of said pairs of spring arms.

9. A tool housing as defined by claim 7 wherein each of said bases is supported by a plurality of ribs connected to said housing wall.

10. A tool housing as defined by claim 1 wherein each of said plurality of spring arms has a generally arcuate shape, and wherein each of said plurality of spring arms is arranged to face another of said plurality of spring arms, said spring arms facing one another being arched towards one another.

11. A tool housing as defined by claim 1 wherein the brushes are moveable in a first direction within the brush holders towards the rotating commutator, and wherein:
    said plurality of spring arms comprise a plurality of spring arms to engage each of said brush holders, and wherein said plurality of spring arms are configured to urge each of said brush holders in a second direction that is generally perpendicular to the first direction.

12. A tool housing as defined by claim 1 wherein each of said spring arms have a first end integrally connected to said housing wall and a second end distal from said first, at least two of said plurality of spring arms proximate one another, said second distal ends on said at least two of said plurality of spring arms extending from said housing wall by different distances, and terminating at substantially the same level to engage one brush holder.

13. A hand tool housing for a hand held tool of the type that includes an electric motor with a rotating portion, two brushes held in two brush holders, the brushes movable in a first direction within the brush holders to conductively contact the rotating motor portion, the housing comprising:
    a housing main body portion having two brackets for supporting the two brush holders;
    an end cap removably attached to said housing main body portion; and,
    a plurality of generally arcuately shaped spring arms integral with said end cap and configured to engage the brush holders and to exert a spring force onto the brush holders in a second direction that is generally perpendicular to the first direction when said end cap is attached to said housing main body portion, each of said plurality of spring arms facing another of said plurality of spring arms and having a substantially flat top end for contacting one of the brush holders.

14. A hand tool housing as defined by claim 13 wherein said plurality of spring arms are arranged into a plurality of generally adjacent pairs of spring arms, and wherein each of the brush holders are supported by two of said plurality of pairs of spring arms.

15. A power tool housing for a power tool of the type that has an electric motor with a rotating commutator, a plurality of conducting brushes for contacting the rotating commutator, and a plurality of brush holders for holding the brushes, the housing comprising:
    a housing wall having a support surface for receiving each of the brush holders; and
    a plurality of pairs of generally adjacent spring arms, each of said spring arms connected to said housing wall and configured to springingly engage the brush holders.

16. A tool housing as defined by claim 15, wherein two of said plurality of pairs of spring arms are arranged facing one another and spaced apart from one another, said two pairs of spring arms for engaging one of the brush holders.

17. A tool housing as defined by claim 15 wherein each individual spring arm of said adjacent pairs of spring arms has a bottom portion, and wherein the housing further includes a base connecting said bottom portions from each of said adjacent spring arms in one of said pairs to one another, said base connected to said housing wall.

18. A tool housing as defined by claim 15 wherein said plurality of spring arms includes four of said pairs of two spring arms.

19. A power tool housing for a power tool of the type that has an electric motor with a rotating commutator, a plurality of conducting brushes for contacting the rotating commutator, and a plurality of brush holders for holding the brushes, the housing comprising:
- a housing wall having a support surface for receiving each of the brush holders; and
- a plurality of spring arms connected to said housing wall, said plurality of spring arms configured to springingly engage the brush holders, each of said spring arms being generally arcuately shaped and tapered wherein a lower portion of said spring arm is thicker than an upper portion.

20. A power tool housing for a power tool of the type that has an electric motor with a rotating commutator, a plurality of conducting brushes for contacting the rotating commutator, and a plurality of brush holders for holding the brushes, the housing comprising:
- a generally concave housing wall having a support surface for receiving each of the brush holders; and
- at least one pair of two generally adjacent spring arms connected to said generally concave housing wall, each of said spring arms configured to springingly engage the brush holders, said two generally adjacent spring arms extending by different lengths from said concave housing wall so as to terminate at substantially the same level.

21. A power tool housing for a power tool of the type that has an electric motor with a rotating commutator, a plurality of conducting brushes for contacting the rotating commutator, and a plurality of brush holders for holding the brushes, each brush holder having at least one side wall, the housing comprising:
- a housing wall having a support surface for receiving each of the brush holders; and
- a plurality of spring arms integral with said housing wall and configured to springingly engage the brush holders, each of said plurality of spring arms having a first end connected to said housing wall and a substantially flat top end distal from said first end for engaging the brush holder sidewall and having a larger area than a cross section of said spring arm to provide an enlarged engagement area.

* * * * *